United States Patent
Brossard

(10) Patent No.: US 12,519,295 B2
(45) Date of Patent: Jan. 6, 2026

(54) DEVICE FOR LOCKING AT LEAST ONE ELECTRIC WIRE AND/OR AT LEAST ONE CABLE ON A SUPPORT IN A BOX

(71) Applicant: SAGEMCOM ENERGY & TELECOM SAS, Rueil-Malmaison (FR)

(72) Inventor: Matthieu Brossard, Rueil-Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 146 days.

(21) Appl. No.: 18/236,780

(22) Filed: Aug. 22, 2023

(65) Prior Publication Data
US 2024/0072523 A1 Feb. 29, 2024

(30) Foreign Application Priority Data
Aug. 23, 2022 (FR) .................................... 2208463

(51) Int. Cl.
*H02G 3/08* (2006.01)
*H05K 5/02* (2006.01)

(52) U.S. Cl.
CPC ........... *H02G 3/083* (2013.01); *H05K 5/0221* (2013.01); *H05K 5/0247* (2013.01)

(58) Field of Classification Search
None
See application file for complete search history.

(56) References Cited

U.S. PATENT DOCUMENTS

| | | | | |
|---|---|---|---|---|
| 2,686,216 A | * | 8/1954 | Appleton | H02G 3/22 174/81 |
| 3,066,902 A | * | 12/1962 | Marins | F16L 3/237 24/339 |
| 3,221,572 A | * | 12/1965 | Swick | F16C 1/108 285/205 |

(Continued)

FOREIGN PATENT DOCUMENTS

| DE | 1100747 B | * | 4/1957 |
|---|---|---|---|
| FR | 1 233 576 A |  | 10/1960 |

(Continued)

OTHER PUBLICATIONS

Communication Under Rule 94(3) issued in FR Application No. 23 192 803.7, dated Feb. 24, 2025.
FR 2208463; Preliminary Search Report mailed Mar. 30, 2023.

*Primary Examiner* — Krystal Robinson
(74) *Attorney, Agent, or Firm* — BIRCH, STEWART, KOLASCH & BIRCH, LLP

(57) ABSTRACT

The invention relates to a communicating meter box including a support and a device for locking at least one electric wire and/or at least one cable on the support, characterized in that it includes:
a base secured to the support
a pin protruding from the base,
at least one wall protruding from the base and extending facing this pin, the base, the pin and the wall together delimiting a passage intended to be traversed by an electric wire to be locked;
a self-locking washer with claws suitable for engaging itself on the pin and mechanically locking itself between the pin and the wall(s) in order to retain, with respect to the base and to the support, one or more electric wires and/or cables previously positioned in the passage.

12 Claims, 4 Drawing Sheets

(56) References Cited

U.S. PATENT DOCUMENTS

| | | | | |
|---|---|---|---|---|
| 3,252,677 A | * | 5/1966 | Achille | F16B 5/123 |
| | | | | 411/510 |
| 3,796,822 A | * | 3/1974 | Eickman | H02G 3/22 |
| | | | | 52/27 |
| 4,072,431 A | * | 2/1978 | Waight | F16C 11/0614 |
| | | | | 403/149 |
| 4,781,255 A | | 11/1988 | Lock et al. | |
| 4,936,530 A | * | 6/1990 | Wollar | F16B 13/02 |
| | | | | 248/68.1 |
| 6,590,154 B1 | * | 7/2003 | Badey | H02G 3/0443 |
| | | | | 174/480 |
| 2009/0188698 A1 | * | 7/2009 | Cloutier | H01B 17/10 |
| | | | | 174/172 |
| 2021/0151970 A1 | | 5/2021 | Robinson et al. | |

FOREIGN PATENT DOCUMENTS

| | | |
|---|---|---|
| GB | 972 995 A | 10/1964 |
| JP | 2011188599 A | 9/2011 |

\* cited by examiner

DEVICE FOR LOCKING AT LEAST ONE ELECTRIC WIRE AND/OR AT LEAST ONE CABLE ON A SUPPORT IN A BOX

CROSS REFERENCE TO RELATED APPLICATIONS

The benefit of priority to French Patent Application No. 2208463 filed Aug. 23, 2022, is hereby claimed and the disclosure is incorporated herein by reference in its entirety.

TECHNICAL FIELD

The invention relates to a device and a method for locking at least one electric cable and/or electric wire on a support, particularly in order to make it follow a particular route or avoid it coming into certain undesirable areas.

It particularly, but without limitation, has an application in the locking of wires or cables in communicating meter boxes.

PRIOR ART

In several electronic products, such as communicating meters, it is sometimes necessary to hold or restrict to a route one or more electric wires (or cables grouping together several wires). This is because the presence of wires or cables in certain areas can give rise to various problems: trapping of parts in the box, obstruction of areas to which it is necessary to have access, disruption of the transmission or reception of the antennas of the box.

Many solutions are conventionally known for holding wires or cables.

One solution consists in clip-fastening onto molded undercuts of a part with a support (the wall of the box for example).

These undercuts are obtained using slider unmolding, which causes an increase in the manufacturing cost. Moreover, in some cases, the complexity of the part and/or the mold makes the use of sliders impossible.

Cable clamps are also known which are intended to be added onto the walls of the boxes. These clamps, often made of plastic, are for example bonded or screwed. They are very effective for holding wires or cables in position. But these solutions are very bulky, which is problematic, particularly in the field of meters where compactness is necessary.

It is also possible to hold the wires or cables by screwing. But this involves an additional step, which lengthens the manufacturing time and requires at least one additional part to then trap the wire. The bulk and also the manufacturing time are therefore not optimized by this step.

Yet another solution consists in trapping the wire in a maze plate. The maze plate can be unmolded without a slider and its method of attachment does not require any additional parts. But the holding of the wire in position in the maze plate is not effective. The wire can easily come out and no longer be restricted in its movements. It is however necessary for the wires to be kept durably in position since maintenance operations must be avoided.

SUMMARY OF THE INVENTION

The invention makes provision for palliating at least one of these drawbacks.

For this purpose, the invention makes provision, in a first aspect, for a communicating meter box comprising a support and a device for locking at least one electric wire and/or at least one cable on the support, characterized in that it comprises:
- a base secured to the support or suitable for being secured thereto,
- a pin protruding from the base,
- at least one wall protruding from the base and extending facing this pin,
- the base, the pin and the wall together delimiting a passage intended to be traversed by one or more electric wires and/or cables to be locked;
- a self-locking washer with claws suitable for engaging itself on the pin and mechanically locking itself between the pin and the wall(s) in order to retain, with respect to the base and to the support, one or more electric wires and/or cables previously positioned in the passage.

The invention, according to a first aspect, is advantageously completed by the following features, taken alone or in any of their technically possible combinations:
- the claws of the self-locking washer are inner claws suitable for anchoring themselves on the pin;
- the claws of the self-locking washer are shaped into a frustoconical shape, which facilitates the pre-positioning of said self-locking washer on the pin;
- the pin comprises a chamfer to facilitate the pre-positioning of the self-locking washer on the pin;
- a wall has a surface facing the pin which is of a shape and dimensions complementary to those of the self-locking washer, said wall participating in the guiding and holding of the self-locking washer;
- several walls protrude from the base, said walls each delimiting, between itself and the pin, a passage intended to be traversed by one or more electric wires and/or cables;
- the pin is hollow in shape;
- the pin and at least one wall extending facing this pin are molded as one part with at least one wall of said box, said wall constituting a base for the device.

The invention also relates, according to a second aspect, to a method for locking at least one electric wire and/or at least one cable on a box support as previously described, the method comprising the following steps:
(E1) inserting at least one electric wire and/or at least one cable into a passage defined by the base, the pin and a wall of the device;
(E2) pre-positioning the self-locking washer on the pin;
(E3) engaging the self-locking washer on the pin all the way into a locking position.

The invention, according to the second aspect, is advantageously completed by the following features, taken alone or in any of their technically possible combinations:
- the engaging of the self-locking washer in the locking position is done by means of an inserting tool suitable for pushing the self-locking element onto the pin;
- the inserting tool comprises a skirt, the edges of which ensure the pushing of the self-locking washer during its engagement on the pin and, defining a cavity with a bottom suitable for abutting against the end of the pin opposite the base, the height of said bottom in said skirt being dimensioned in such a way that the locking position into which the self-locking washer is pushed leaves one or more electric wires and/or cables free to slide with one degree of freedom inside the passage, said bottom then abutting the pin before the self-locking washer comes into contact with the wire(s) and/or cable(s);

the self-locking washer comes into contact with one or more electric wires and/or cables, said electric wire(s) and/or cable(s) being held fixedly inside the passage by the self-locking washer.

The advantages of the invention are several.

The bulk is reduced and the holding in position is effective.

In addition, the solution does not have any undercut shapes which allows for a simple unmolding, with no additional movements or sliders. Its implementation in production is simplified and economical. The molding process is simplified, the mold used being a single mold for the box and the support. The mold used does not require the presence of sliders.

Furthermore, this device makes it possible to hold wires of different shapes and different sizes in position.

OVERVIEW OF THE FIGURES

Other features, aims and advantages of the invention will become apparent from the following description, which is purely illustrative and non-limiting, and which must be read with reference to the appended drawings wherein.

In all the figures similar elements bear identical reference numbers.

DETAILED DESCRIPTION

Electric boxes, more particularly the boxes of communicating meters, can include many wires or cables for the connection of their different electronic modules, the communication therebetween, their power supply etc. These wires or cables can be individual electric wires (electric conductors with insulating protective envelope), groupings of electric wires (twisted, braided, soldered etc.), cables grouping together different electric wires into one and the same sheath, fiber optics cables etc.

The attachment of the wires and cables must be done in such a way that they are held in position durably and compactly.

Exemplary Embodiment of a Locking Device

Figure 1:
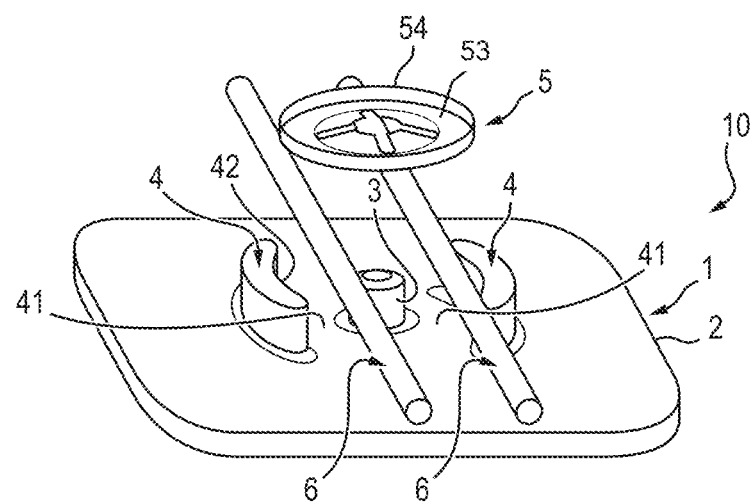
FIG. 1 illustrates a device according to an embodiment of this invention.
Figure 2:
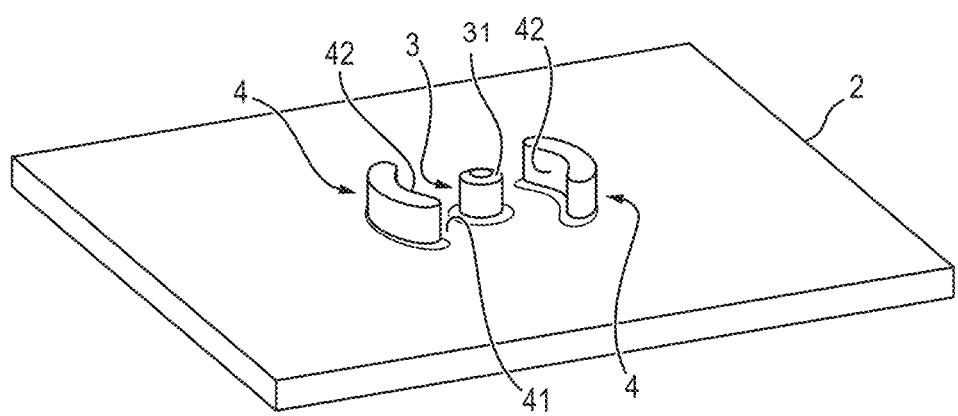
FIG. 2 illustrates a support of the device according to an embodiment of this invention.
Figure 3:
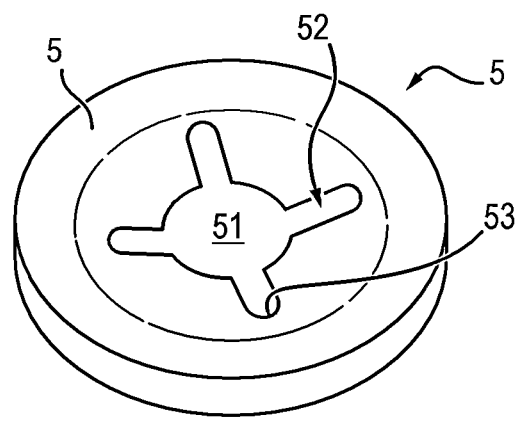
FIG. 3 illustrates a self-locking element according to an embodiment of this invention.

As illustrated in FIGS. 1 to 3, in order to fulfil this function of holding on a given support 1, one or more locking devices 10 are used, which will together define a positioning path for the wire or the cable. Such a device 10 comprises a base 2, where applicable colinear with the support 1, as well as a pin 3 and at least one wall 4, each protruding from the base 2.

The base 2, the pin 3 and the wall 4 together delimit a passage 41. This passage 41 is suitable for being traversed by an electric wire or a cable 6, i.e. the passage 41 is wide enough to allow a wire or cable 6 that one wishes to lock to traverse it in a linear manner.

In the example illustrated in the figures, the device 10 comprises two diametrically opposed walls 4. A greater number of walls 4 may of course be envisioned to create different possible routings for the wires and cables 6.

The device 10 further comprises a self-locking element 5, such as a self-locking washer, able to be engaged on the pin 3 (via an orifice 51). Its shape and its outer dimensions are complementary to those of the surfaces 42 of the walls 4, said walls 4 participating in the guiding and/or holding of the self-locking element 5 on the device 10.

As illustrated by FIG. 1, the surfaces 42 of the walls 4 which are directly facing the pin 3 are in arcs of cylinders, other geometries of course being possible according to the shape of the self-locking element 5. Particularly, in the case of a self-locking washer 5 of square shape, the surfaces 42 can be flat to frame the sides of the washer 5 or be composed of two planes at right angles to receive the corners of the washers.

When it is in a position engaged on the pin 3 and mechanically locked between the pin 3 and the wall (or walls) 4, the self-locking element 5 covers at least one section of the passage 41, which makes it possible to lock a wire or cable 6 that would have been previously positioned in said passage 41 by preventing it from disengaging from the passage 41.

The pin 3 is advantageously cylindrical but can be of another shape such as parallelepipedal for example.

According to an embodiment, the self-locking element 5 is a washer with claws, particularly a washer having a series of inner claws 52 extending from one and the same outer annular ring 53. The ends of the claws 52 together define the orifice 51 of the washer 5. They are dimensioned and shaped to anchor themselves, by their free ends, onto the pin 3 when said washer 5 is engaged and pushed onto it.

For example, the claws 52 are flat claws and their ends are shaped in arcs of circles.

Said claws 52 are furthermore shaped with mechanical properties which allows them elasticity of deformation during the placing of the washer 5 on the pin 3, two successive claws 52 being mutually separated by slots traversing the thickness of the washer 5.

Furthermore, when the washer 5 is not stressed, said claws 52 together define a frustoconical shape, which facilitates the pre-positioning of said washer 5 on the pin 3. The orientation of the frustoconical part of the washer 5 formed by the claws 52 defines an outer face 54 and an inner face 55 and of the washer 5.

Also, and as can also be seen in FIG. 1, the pin 3 comprises a chamfer 31 at its end. The pre-positioning of the self-locking washer 5 on the pin 3 is facilitated by the presence of the chamfer 31 of the pin 3 with which the inner part 55 of the self-locking washer 5 comes into contact.

Other types of self-locking element can however be used, the anchoring being able to be embodied just as well on the pin 3 or on the wall (or walls) 4 of the device 10, or else on both. In particular, in another embodiment a self-locking element 5 is a flat elastically deformable ring, able to be diametrically compressed on itself during the placement on the pin 3, to then be released for anchoring onto the wall (or walls) 4.

The dimensions of the pin 3 and of the walls 4 are of course a function of the type of wires or cables 6 that one wishes to lock.

Figure 4:
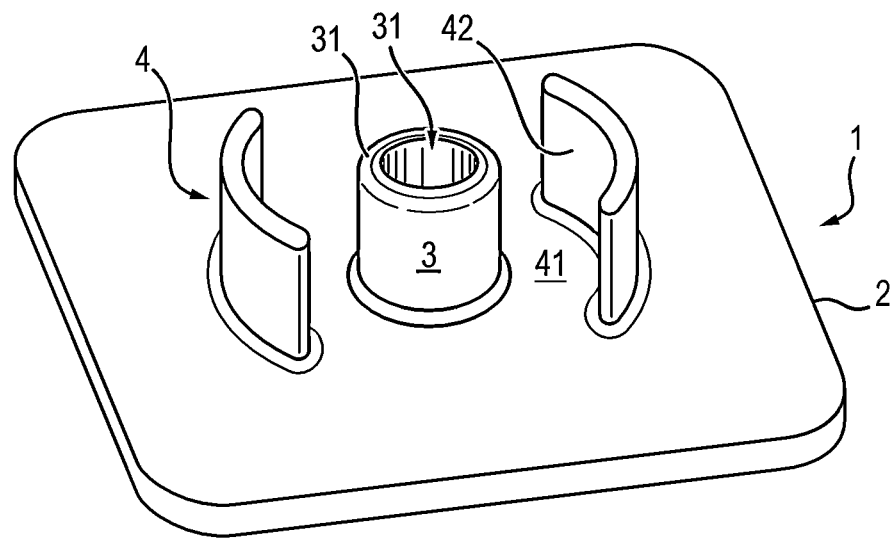
FIG. 4 illustrates a support of the device according to another embodiment.

If the pin 3 must have a wide diameter, greater than the thickness of the support 1, the pin 3 is for example a hollow cylinder, the wall thickness of which is equal to the thickness of the support 1 and of the wall (or walls) 4. This embodiment, illustrated by FIG. 4, makes it possible to avoid a shrinking phenomenon in the event of an excessive pin 3 thickness.

The self-locking element 5, meanwhile, can a be standard element made of plastic or steel. A self-locking washer 5 of the type described is for example made by stamping.

Exemplary Embodiment

Figure 5:
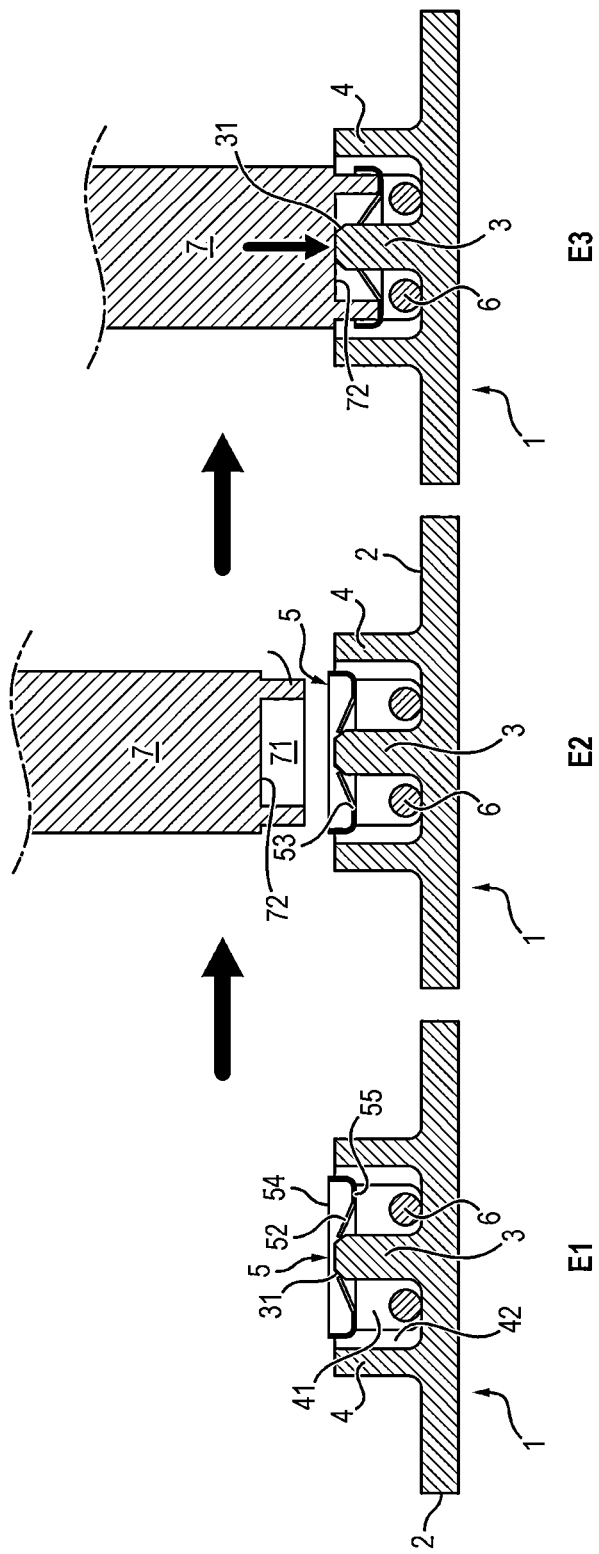
FIG. 5 illustrates a section view of the device in different steps of a wire-locking method according to an embodiment of this invention.

An example of locking of wires or cables 6 is illustrated by FIG. 5.

In a first step E1, at least one wire or one cable 6 is placed in a passage 41 formed by the base 2, the pin 3 and at least one wall 4. According to the number of walls 4 and according to the routing that one wishes to organize for the wires or cables, wires and/or cables 6 can be positioned in several passages 41 of one and the same device 10.

In a second step E2, the self-locking element 5 is prepositioned on the pin 3. The pre-positioning is facilitated by the chamfer 31 of the pin 3 and by the frustoconical shape formed by the set of claws 52. In the case of a self-locking washer 5 of the type described, the inner part 55 of the self-locking washer 5 formed by the claws 52 is in contact with the chamfer 31 of the pin 3. Further to this pre-positioning step E2, the self-locking washer 5 covers the passages 41 between the walls 4 and the pin 3.

In a third step E3 the self-locking element 5 engaged on the pin 3 is pushed onto the pin to then be mechanically locked in the locking position between the pin 3 and the wall (or walls) 4.

In the case of the self-locking washer 5 described above, the positioning in the locking position on the pin 3 is irreversible due to the presence of the claws 52 which are suitable for coming into contact with the pin 3. Once positioned, the self-locking washer 5 cannot be removed from the pin 3 without damaging the device 10.

Advantageously, an inserting tool 7 is used to position the self-locking element 5 in the locking position. Typically, the tool 7 then exerts a pressure on the ring 53 of the self-locking washer 5. This inserting tool 7 preferably comprises a skirt 70, the edge of which serves to push the self-locking element. This skirt 70 delimits a cavity 71 with a bottom 72 abutting against the end of the pin 3 to avoid pinching the wires or cables 6 and to leave them free to slide in the passage or passages 41.

In this way, one or more wires (and/or cables) 6 are
either held fixedly in the passage (or passages) 41 if the self-locking washer 5 comes into contact with one or more of the wires/cables 6 before the bottom 72 of the cavity 71 abuts against the end of the pin 3,
are left sliding with one degree of freedom in the passage (or passages) 41 if the self-locking washer 5 abuts against the end of the pin 3 before coming into contact with the wire(s)/cable(s) 6.

For one and the same device 10, different sizes of tools and different depths of bottom 72 may be envisioned. In this way it is possible to adapt to the dimensions of the wires and cables 6 that one wishes to position in the passages 41.

According to another mode of implementation and according to the structure of the self-locking element 5, the latter can be positioned in a locking position on the pin 3 in a different manner, such as for example by interference fitting.

Figure 6:
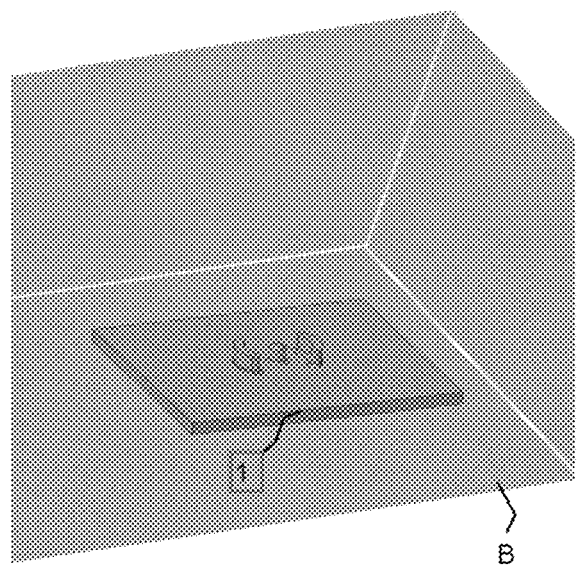
FIG. 6 illustrates a box comprising a support according to an embodiment.

Preferably, the support 1, the base 2, the pin 3 and the wall (or walls) 4 are molded as a single part with at least one wall of a box B, said wall forming a base 2 for the device, as illustrated by FIG. 6.

The support 1 can be a wall of the box B, for example a wall of a smart meter box. The base 2 can itself be coincident with this wall.

Thus, the molding of the base 2, of the pin 3 and of the wall (or walls) 4 is done in the context of the molding of the box B, a single mold making it possible to manufacture the box B with such a support 1. The mold making it possible to obtain the box B with the support 1 is a simple mold without sliders, which facilitates production.

The invention claimed is:

1. A communicating meter box comprising a support and a device for locking at least one electric wire and/or at least one cable on the support, characterized in that it comprises:
   a base secured to the support or suitable for being secured thereto,
   a pin protruding from the base,
   at least one wall protruding from the base and extending facing this pin,
   the base, the pin and the wall together delimiting a passage intended to be traversed by one or more electric wires and/or cables to be locked;
   a self-locking washer with claws suitable for engaging itself on the pin and mechanically locking itself between the pin and the wall (or walls) in order to retain, with respect to the base and to the support, one or more electric wires and/or cables previously positioned in the passage.

2. A communicating meter box as claimed in claim 1, wherein the claws of the self-locking washer are inner claws suitable for anchoring themselves onto the pin.

3. The communicating meter box as claimed in claim 1, wherein the claws of the self-locking washer are shaped into a frustoconical shape, which facilitates the pre-positioning of said self-locking washer on the pin.

4. The communicating meter box as claimed in claim 1, wherein the pin comprises a chamfer to facilitate the pre-positioning of the self-locking washer on the pin.

5. The communicating meter box as claimed in claim 1, wherein a wall has a surface facing the pin which is of a shape and dimensions complementary to those of the self-locking washer, said wall participating in the guiding and holding of the self-locking washer.

6. The communicating meter box as claimed in claim 1, wherein several walls protrude from the base, said walls each delimiting, between itself and the pin, a passage intended to be traversed by one or more electric wires and/or cables.

7. The communicating meter box as claimed in claim 1, wherein the pin is hollow in shape.

8. The communicating meter box as claimed in claim 1, wherein a pin and at least one wall extending facing this pin are molded as one part with at least one wall of said box, said wall constituting a base for the device.

9. A locking method for at least one electric wire and/or at least one cable on a box support as claimed in claim 1, the method comprising the following steps:
   (E1) inserting at least one electric wire and/or at least one cable into a passage (41) defined by the base, the pin and a wall of the device;
   (E2) pre-positioning the self-locking washer on the pin;
   (E3) engaging the self-locking washer on the pin all the way into a locking position.

10. The locking method as claimed in claim 9, wherein the engaging of the self-locking washer in the locking position is done by means of an inserting tool suitable for pushing the self-locking element onto the pin.

11. The locking method as claimed in claim 10, wherein the inserting tool comprises a skirt, the edges of which ensure the pushing of the self-locking washer during its engagement on the pin and, defining a cavity with a bottom suitable for abutting against the end of the pin opposite the base, the height of said bottom in said skirt being dimensioned in such a way that the locking position into which the self-locking washer is pushed leaves one or more electric wires and/or cables free to slide with one degree of freedom inside the passage, said bottom then abutting the pin before the self-locking washer comes into contact with the wire(s) and/or cable(s).

12. The locking method as claimed in claim 9, wherein the self-locking washer comes into contact with one or more electric wires and/or cables, said electric wire(s) and/or cable(s) being held fixedly inside the passage by the self-locking washer.

\* \* \* \* \*